US005472007A

United States Patent [19]
Malott

[11] Patent Number: 5,472,007
[45] Date of Patent: Dec. 5, 1995

[54] TRAVEL LATCH FOR A RETRACTABLE AWNING

[75] Inventor: Dale G. Malott, Middlebury, Ind.

[73] Assignee: The Dometic Corporation, LaGrange, Ind.

[21] Appl. No.: 204,666

[22] Filed: Mar. 2, 1994

[51] Int. Cl.$^6$ ................................................. E04H 15/08
[52] U.S. Cl. ........................ 135/88.1; 135/88.12; 160/66
[58] Field of Search ............................ 135/88.07, 88.1, 135/88.11, 88.12; 160/71, 72, 66, 67, 46

[56] References Cited

U.S. PATENT DOCUMENTS

| | | | |
|---|---|---|---|
| 3,789,903 | 2/1974 | Clark et al. | 135/88.12 |
| 3,918,510 | 11/1975 | Hayward | 135/88.12 X |
| 3,918,511 | 11/1975 | Upton, Jr. | 135/88.12 X |
| 4,077,419 | 3/1978 | Lux . | |
| 4,117,876 | 10/1978 | Bennett . | |
| 4,640,332 | 2/1987 | Turner | 160/46 |
| 4,658,877 | 4/1987 | Quinn . | |
| 4,719,954 | 1/1988 | Curtis et al. . | |
| 4,819,706 | 4/1989 | Quinn . | |
| 5,094,285 | 3/1992 | Murray . | |
| 5,172,743 | 12/1992 | Wallace et al. . | |

Primary Examiner—Lanna Mai
Attorney, Agent, or Firm—Pearne, Gordon, McCoy & Granger

[57] ABSTRACT

A retractable awning is provided to be mounted on a side of a recreational vehicle. The awning includes a canopy, a roller about which the canopy can be can be rolled or unrolled, a pair of support arms, a pair of tension rafters, and at least one latch or spring clip to retain the awning adjacent the vehicle while traveling. The support arms define a longitudinally extending channel and have a pair of flanges inwardly extending from each side wall. The support arms have one end supporting the canopy and another end contacting a supporting surface. The generally rectangularly-shaped tension rafters have one end operatively secured to the side of the recreational vehicle and another end operatively connected to an associated one of the support arms. Each of the tension rafters is sized so as to be nestable in the channel of the associated support arm. The spring clip is retained on one of the tension rafters and has a base portion, a pair of angled side portions extending upwardly and outwardly from opposed edges of the base portion, and tongue portions outwardly extending from the side portions. The tongue portions are adapted to interlock with the flanges of the support arms and the side portions are resiliently displaceable to releasably secure the tension rafter to the associated support arm when nested therein.

14 Claims, 2 Drawing Sheets

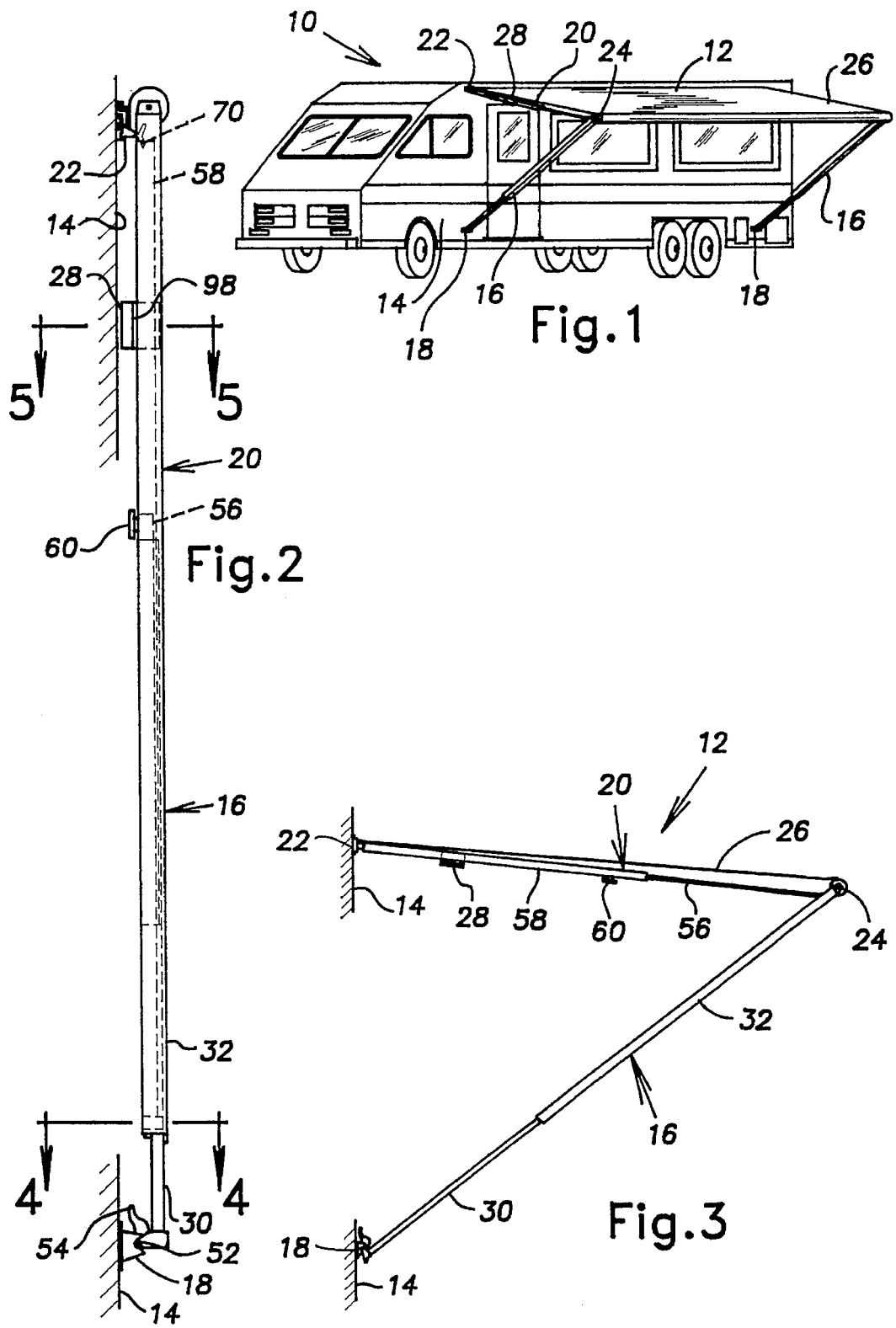

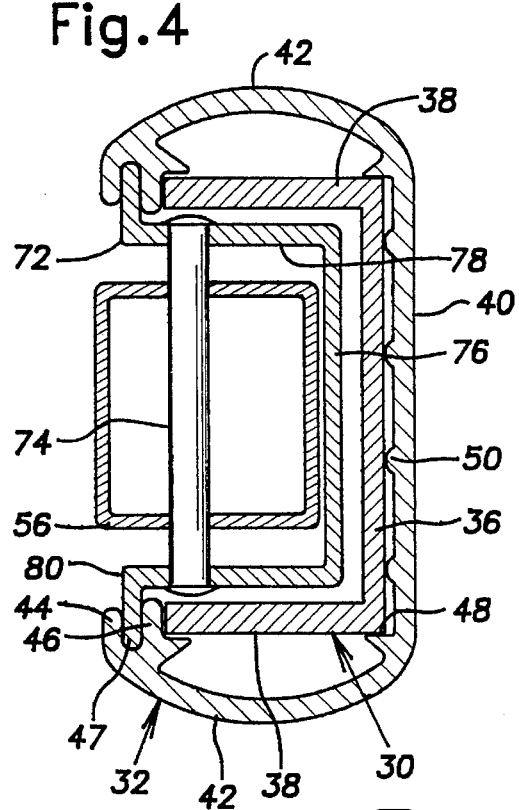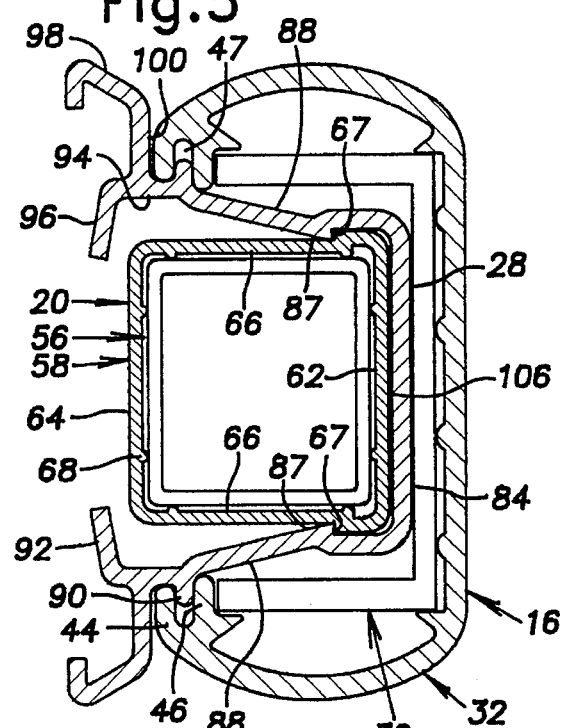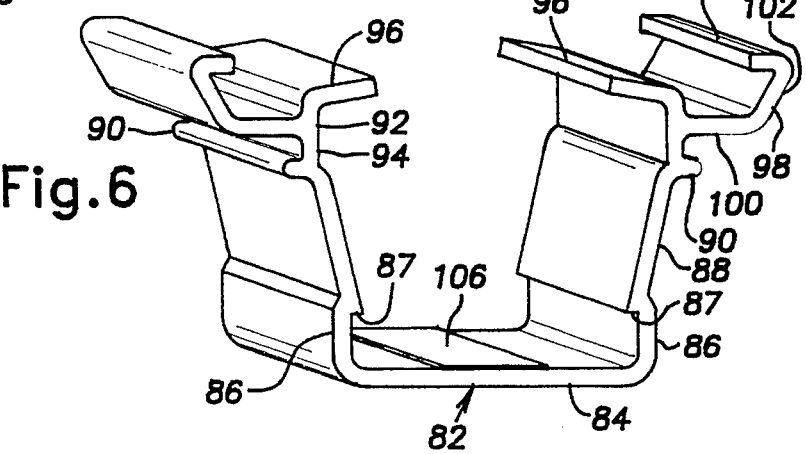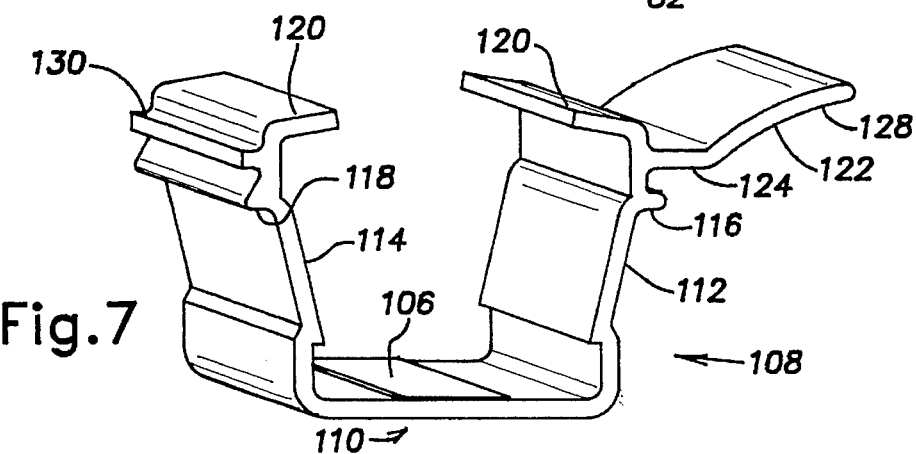

TRAVEL LATCH FOR A RETRACTABLE AWNING

BACKGROUND OF THE INVENTION

1. Field of the Invention

The present invention generally relates to a retractable awning for attachment to the side of a recreational vehicle, and more specifically to such an awning having a latch to releasably secure the awning in a retracted position adjacent the side of the recreational vehicle.

2. Description of the Related Art

A retractable awning is often attached to the side of a recreational vehicle, such as a travel trailer or mobile home. The awning is retractable to a stored position adjacent the side of the recreational vehicle during transportation and can be moved from the stored position to an extended position. When in the extended position, the awning can provide protection from the sun or rain. In order to safeguard against the awning moving or extending while the recreational vehicle is in motion, locking mechanisms have been employed which retain the awning in the stored position.

A retractable awning typically includes a pair of support arms which support at their upper ends a roller or roller tube around which a canopy can be rolled and unrolled. Alternatively, in a stationary roll or "box-type" awning, the roller is connected to the side of the recreational vehicle and the upper ends of the support arms are connected to an end of the canopy. In either type, tension rafters are usually provided which extend beneath opposite edges of the canopy and are operatively connected to the support arms to brace the awning in the extended position and tension the canopy. Typically, the support arms are channel-shaped having a channel into which an associated tension rafter is nested when the awning is in the stored position. The above-mentioned locking mechanisms retain the awning in the stored position during traveling by retaining the tension rafters within the support arms.

U.S. Pat. No. 5,172,743, the disclosure of which is expressly incorporated herein in its entirety, is exemplary of such locking mechanisms. The '743 locking mechanism has a generally cylindrical locking pin extending upwardly from the rafter arm. When the awning is in the retracted position, the pin extends through an opening in the support arm and into a lock keeper. The lock keeper is slidably mounted to the outside of the support arm. To lock the awning in the retracted position, the lock keeper must be moved downwardly to cause a notch in the lock keeper to engage a head of the pin.

U.S. Pat. No. 4,719,954, the disclosure of which is expressly incorporated herein by reference, provides a locking fork slidably mounted on the end of the support arm adjacent the roll bar and having a gear tooth. To lock the awning in the retracted position, the fork must be moved upwardly to engage the gear tooth with a gear attached to the end of the roll bar. Additionally, straps attached to the rafter arms can be wrapped and tied around the rafter arms and associated support arms to further lock the awning in the retracted position. See also U.S. Pat. Nos. 4,077,419, 4,117, 876, and 4,658,877, the disclosures of which are expressly incorporated herein by reference, for similar locking mechanisms which engage the roll bar at the top of the support arm.

U.S. Pat. No. 5,094,285, the disclosure of which is expressly incorporated herein by reference, provides a support arm which folds into a rafter arm. The support arm is provided with a pin which longitudinally slides into a slot within the tension rafter when the support is shortened to prevent the support arm from pivoting away from the rafter arm. To lock the support arm in the shortened position and ensure that the support arm stays within the rafter arm a clamping knob must be tightened.

U.S. Pat. No. 4,819,706, the disclosure of which is expressly incorporated herein by reference, discloses a locking arm pivotally mounted to the support arm. When the awning is in the retracted position the locking arm must be pivoted from a retracted position to a locking position. In the locking position a flange on the locking arm obstructs part of the opening of the support arm channel to retain the rafter arm in the support arm channel. The locking arm is provided with a camming surface that, if the locking arm is placed in the locking position before the rafter arm is positioned within the support arm, automatically cams the locking arm away from the support arm channel.

The prior art locking mechanisms suffer from the disadvantage that they require a number of parts or assemblies and therefore increase the assembly time and cost of the awning. Therefore, there is a need in the art for an improved locking mechanism that secures or retains the awning in the stored position. Moreover, there is a need in the art for a locking mechanism which is inexpensive and easily installed on new or existing awnings or easily replaced.

SUMMARY OF THE INVENTION

The present invention provides a retractable awning which solves the above-noted problems found in the prior art locking mechanisms. The retractable awning of the present invention provides a latch which is held by a rafter arm and is adapted to engage a lip provided inside a channel-shaped support arm when the rafter arm and support arm are nested together.

In accordance with the present invention, the retractable awning includes a canopy, a roller about which the canopy can be can be rolled and unrolled, a pair of support arms, a pair of tension rafters, and a latch. The channel-shaped support arms form a longitudinally extending channel and have at least one lip therein. The support arms have one end supporting the canopy and another end contacting a supporting surface. The tension rafters have one end operatively secured to a substantially vertical surface and another end operatively connected to an associated one of the support arms. Each of the tension rafters is sized to be longitudinally nestable in the channel of the associated support arm. The latch is retained on one of the tension rafters and is adapted for engaging one or both lips of the associated support arm to releasably secure the tension rafter to the associated support arm when nested therein.

The retractable awning of the present invention is secured in the stored position by releasably securing the tension rafter in the associated support arm with the latch. By securing the tension rafter with a latch that engages a lip of the support arm, the total quantity of parts is minimized, and the time and labor required for assembly is reduced. Additionally, the latch can be adapted for existing awnings and is easily installed or replaced.

BRIEF DESCRIPTION OF THE DRAWINGS

These and further features of the present invention will be apparent with reference to the following description and drawings, wherein:

FIG. 1 is a side perspective view of a recreational vehicle incorporating the awning according to the present invention supported in an extended position by support arms and tension rafters;

FIG. 2 is a side elevational view of the awning of FIG. 1 in a stored position;

FIG. 3 is a side elevational view of the awning of FIG. 1 in the extended position;

FIG. 4 is a cross-sectional view of the awning taken along line 4—4 of FIG. 2;

FIG. 5 is a cross-sectional view of the awning taken along line 5—5 of FIG. 2;

FIG. 6 is a perspective view of a latch; and

FIG. 7 is a perspective view of an alternative latch having a single release handle.

DETAILED DESCRIPTION OF THE PREFERRED EMBODIMENT

Referring now to the drawings, and in particular to FIG. 1, therein is illustrated a recreational vehicle 10 having an awning 12 that incorporates the present invention. The awning 12 is mounted to a substantially vertical support surface 14 such as a side of the recreational vehicle 10, and is movable between an extended position and a stored position adjacent the side surface of the recreational vehicle 10 (shown in FIG. 2). As also shown in FIG. 3, the retractable awning 12 includes a pair of support arms 16 pivotally connected at a lower end to a pair of lower brackets 18 mounted on the support surface 14, a pair of tension rafters 20 pivotally connected at an upper end on a pair of upper brackets 22 mounted on the support surface 14 and slidably connected at a lower end to an associated one of the support arms 16, a roller or roller tube 24 rotatably connected at opposite ends to upper ends of the support arms 16, a canopy 26, and a pair of latches 28.

Each support arm 16 comprises an inner member 30 and an outer member 32. In the preferred embodiment, the inner and outer members 30, 32 are generally channel-shaped and fabricated from a suitable durable material such as steel, aluminum, or plastic composite. The inner member 30 is slidably or telescopically mounted within the outer member 32 so that the support arm 16 is longitudinally adjustable to any desired length. The inner member 30 has a plurality of openings (not shown) provided along a side thereof and the outer member 32 has a handle (not shown) carrying a lock pin (not shown) which can be inserted into any of the openings of the inner member 30 to releasably set the length of the support arm 16. The handle and openings are conventional and allow easy extension or retraction of the support arm inner and outer members 30, 32.

As best seen in FIG. 4, the inner member 30 is formed by a main wall 36 and a pair of side walls 38 extending from edges of the main wall 36 to define a channel which extends along the length of the inner member 30. In the preferred embodiment, the side walls 38 have a planar and generally parallel relationship to each other and are substantially perpendicular to the main wall 36. The outer member 32 is also formed by a main wall 40 and a pair of side walls 42 extending from edges of the main wall 40 to define a channel which extends along the length of the outer member 32. The side walls 42 of the illustrated embodiment are provided with an outwardly curved configuration. This curved configuration provides some space between the side walls 38 of the inner member 30 and the side walls 42 of the outer member 32. This space is particularly desirable to accommodate a locking mechanism for the inner and outer members 30, 32, such as the above described handle and openings.

The outer member 32 has a pair of flanges 44, 46 extending inwardly from the end of each of the side walls 42 opposite the main wall 40. The flanges 44, 46 are substantially parallel to the main wall 40 to form a groove 47 therebetween which extends along the length of the outer member 32. The inner flange 46 forming the groove 47 is preferably of sufficient length to retain the inner member 30 slidably within the outer member 32. In the illustrated embodiment, the outer flange 44 has a length slightly less than the length of the inner flange 46. The outer member 32 also has shoulders or guides 48 to slidably retain the inner member 30 within the outer member 32. The guides 48 are adapted to face the inner member 30 and form a generally rectangularly-shaped space for the inner member 30 to slide within the outer member 32. The main wall 40 of the outer member 32 is preferably provided with ridges 50 to reduce the friction between the inner and outer members 30, 32. The ridges 50 contact the main wall 36 of the inner member 30 along substantially parallel lines in a longitudinal direction.

As best seen in FIG. 2, the lower end of each inner member 30 of the support arms 16 is pivotally mounted on the associated lower bracket 18 which is secured to the support surface 14. Preferably the lower ends of the support arms 16 are releasable from the lower brackets 18 so that they can be swung outwardly and placed on the ground. When placed on the ground the support arms 16 form a vertical support as opposed to the inclined support as illustrated in FIG. 1. The lower end of the inner member 30 of the support arm 16 has a transverse pin 52 which is received within the lower bracket 18 so that the support arm 16 is pivotable about the axis of the pin 52. The lower bracket 18 has a releasable catch 54 to hold the pin 52 within the bracket 18. If it is desired to put the support arm 16 on the ground, the catch 54 is moved to release the pin 52.

As best seen in FIG. 3, the tension rafters 20 also include an inner member 56 and an outer member 58. In the preferred embodiment, the inner and outer members 56, 58 are generally rectangular and fabricated from a suitable durable and light weight material such as aluminum, or plastic composite. The inner member 56 is slidably or telescopically mounted within the outer member 58 so that the tension rafter 20 is longitudinally adjustable to any desired length. Once a desired length is obtained, it can be maintained by an adjustable knob 60 which has a threaded portion (not shown) which extends through a longitudinal slot in the outer member 58 to engage a steel insert (not shown) fixed to the inner member 56 as is conventional. By tightening the knob 60 the friction between the inner and outer members 56, 58 can be increased to inhibit relative movement between the inner and outer members 56, 58. The knob 60 arrangement allows easy extension or retraction of the tension rafter inner and outer members 56, 58.

As best seen in FIG. 5, the inner member 56 is generally rectangular in cross section. The outer member 58 is also generally rectangular in cross section formed by a top wall 62, a bottom wall 64, and a pair of side walls 66 extending from and connecting edges of the top and bottom walls 62, 64 to define a generally rectangular space which extends for the length of the outer member 58. The outer surfaces of the side walls 66 preferably form shoulders 67. The walls 62, 64, 66 of the outer member 58 are also preferably provided with inwardly extending guides or ridges 68 to reduce the friction between the inner and outer members 56, 58 and guide the inner member 56 within the outer member 58. The ridges 68 contact the inner member 56 along substantially parallel lines in a longitudinal direction.

As best seen in FIG. 2, the upper end of each of the tension rafter outer members 58 is pivotally mounted to the upper bracket 22 by a pin or tube rivet 70. The upper bracket 22 is secured to the support surface 14. As shown in FIG. 4, the lower end of each tension rafter inner member 56 is pivotally mounted to a slide 72 by a pin or tube rivet 74. The slide 72 has a channel-shaped configuration, similar to the inner member 30 of the support arm 16, with a main wall 76 and a pair of side walls 78. However, at the end of each side wall 78 opposite the main wall 76 is a flange 80. The flanges 80 extend outwardly in a direction substantially perpendicular to the side walls 78 and substantially parallel to the main wall 76. The flanges 80 of the slide 72 are slidably retained within the grooves 47 formed by the flanges 44, 46 of the support arm outer member 32. Preferably means are provided on the outer member 32 of the support arm 16 to ensure that the slide 72 does not fall out of the support arm 16. Additionally, means are preferably provided on the outer member 32 of the support arm 16 for releasably locking the slide in position when it is generally at the upper end of the support arm 16 to lock the awning 12 in the extended position.

The canopy 26 is typically made of fabric or vinyl material and is generally rectangularly shaped. As best seen in FIG. 3, the inner edge of the canopy 26 is secured to the support surface 14 in any suitable manner, such as a horizontal anchor bar fastened to the support surface 14, so as to extend between the upper brackets 22. The opposite or outer edge of the canopy 26 is secured to the roller 24 in a manner such that the canopy 26 will wrap around the roller 24 when the awning 12 is retracted from the extended position as illustrated in FIGS. 1 and 3, to the stored position, as illustrated in FIG. 2.

The roller 24 may take the form of a long cylindrical body about which the canopy 26 can be rolled and is rotatably supported by the upper ends of the outer members 32 of the support arms 16 as is conventional. Preferably a torsion spring (not shown) is positioned therein, as is conventional, for biasing the roller 24 into the retracted position due to the fact that the rolling of the roller 24 as the awning 12 is extended causes a loading of the torsion spring. Thus the roller 24 is conditioned to roll in the opposite direction thereby easing retraction of the awning 12 to the stored position.

As shown in FIG. 6, the latch 28 of the illustrated embodiment is a spring clip. The latch 28 has a generally channel-shaped base portion 82. The channel-shaped base portion 82 is formed by a main wall 84 and a pair of side walls 86 extending substantially perpendicular to the main wall 84 from edges of the main wall 84. Preferably, the inner surface of the side walls 86 form downwardly (as viewed in FIG. 6) directed shoulders 87. Extending upwardly (as viewed in FIG. 6) and inclined outwardly from the edges of the side walls 86 of the base portion are side portions 88. Extending from the edges of the side portions 88 opposite the base portion 82 are tongue portions 90. The tongue portions 90 extend outwardly substantially parallel to the main wall 84 of the base portion 82. Leg portions 92 extend upwardly (as viewed in FIG. 6) from the side portions 88. The leg portions 92 have a first section 94 extending upwardly from the side portion 88 substantially perpendicular to the main wall 84 of the base portion 82 and a second section 96 extending inwardly and upwardly from the edge of the first section 94 opposite the side portion 88. Extending outwardly from the first sections 94 of the leg portions 92 are handle portions 98. Each handle portion 98 has a first section 100 extending outwardly from the leg portion 92 substantially parallel to the main wall 84 of the base portion 82, a second section 102 extending upwardly (as viewed in FIG. 6) and outwardly from the first section 100, and a third section 104 extending inwardly from the second portion 102 substantially parallel to the main wall 84 of the base portion 82.

The spring clip or latch 28 is preferably an extrusion fabricated of a material having resilient or elastic properties such as a thermoplastic. Polyvinyl chloride (PVC) for example, has the desirable properties of elasticity, weather resistance, ultra violet radiation resistance, cleaning solvent resistance, relatively high strength, easy colorability, relatively low cost, and easy extrudability. The material of the preferred embodiment of the latch 28 is a PVC blend GEON 85857 manufactured by the B.F. Goodrich Company. However, it will be noted that other materials having the required properties may be utilized such as, for example, spring steel.

The latch 28 is easily attached by simply snapping it over the tension rafter 20, as shown in FIG. 5. The latch 28 is attached to the outer member 58 of the tension rafter 20 generally adjacent the upper end of the tension rafter 20, as illustrated in FIGS. 2 and 3. As best seen in FIG. 5, the latch 28 is retained on the outer member 58 of tension rafter 20 by the shoulders 87 of the latch base portion 82 engaging the shoulders 67 of the outer member side walls 66. Retained by the shoulders 67, 87, the latch 28 is slidably attached to the outer member 58 of the tension rafter 20. Attached in this manner, an operator can position the latch 28 to an optimum position, i.e. a maximum height that can comfortably be reached by the operator. The latch 28 must be attached as high as possible to minimize the forces applied to the latch 28 as the awning 12 is retracted. If a specific position is desired to be maintained, an adhesive strip 106 can be placed between the base portion 82 of the latch 28 and the top wall 62 of the tension rafter outer member 58. The latch of the preferred embodiment is secured by a 0.025 inch thick foam adhesive tape. The latch 28 can alternately be secured to the outer member 58 of the tension rafter 20 by other conventional fasteners.

The latch 28 is specifically sized and dimensioned to extend around the outer member 58 of the tension rafter 20 such that the main wall 84 of the base portion 82 is adjacent the top wall 62 of the tension rafter outer member 58. In this position, the side portions 88 of the latch 28 extend generally outwardly adjacent the side walls 66 of the tension rafter outer member 58.

The tongue portions 90 are formed and dimensioned to engage the grooves 47 formed by the flanges 44, 46 of the support arm outer member 32 to retain the tension rafter 20 in the support arm 16 when the awning 12 is in the stored position. The tongue portions 90 are also formed and dimensioned to disengage the grooves formed by the flanges 44, 46 of the support arm outer member 32 when the side and leg portions 88, 92 of the latch 28 are deflected inwardly to release the tension rafter 20 from the support arm 16.

The leg portions 92 are formed and dimensioned such that the first section 94 is adjacent the side walls 66 of the tension rafter outer member 58 and the second section 96 is adjacent the bottom wall 64 of the tension rafter outer member 58 when the side and leg portions 88, 92 of the latch 28 are resiliently deflected inwardly to disengage the tongue portion 90 from the groove 47 formed by the flanges 44, 46 of the support arm outer member 32. Preferably, the second section 96 of the latch leg portions 92 are inwardly and upwardly (as viewed in FIG. 6) inclined when not deflected in order to permit deflection of the side and leg portions 88, 92 of the latch 28. The second section 96 of the leg portions 92 of the preferred embodiment are inclined approximately 10 degrees. The first section 100 of the handle portion 98 is formed and dimensioned to be adjacent the outer flange 44 of the support arm outer member 32 when the tongue portion 90 of the latch 28 is within the groove 47 formed by the flanges 44, 46 of the support arm outer member 32.

In the stored position, as shown in FIG. 2, the tension rafters 20 and support arms 16 have a substantially parallel relationship to the support surface 14 or the side of the recreational vehicle 10. Each tension rafter 20 is nested within the channel of the associated support arm 16 so that the latch 28 is between the tension rafter 20 and the support arm 16 (best seen in FIG. 5). In this position the grooves 47 formed by the flanges 44, 46 of the support arm outer member 32 are engaged by the tongue portion 90 of the latch 28 to retain the tension rafter 20 in the support arm 16 and thereby lock the awning 12 in the stored position.

As best seen in FIGS. 2 and 5, to move the awning 12 from the stored position to the extended position, the latch 28 must be unlocked. The latch 28 is unlocked by grasping around the support arm 16 with one hand and placing the thumb on one handle portion 98 and at least one finger on the other handle portion 98. The handle portions 98 are then deflected or squeezed inwardly until the tongue portions 90 are inwardly beyond the outer flange 44 of the support arm outer member 32. When the handle portions 98 are inwardly deflected, the side and leg portions 88, 92 of the latch are deflected to be generally adjacent to and extending around the outer member 58 of the tension rafter 20. The handle portions 98 are then pushed to remove the tension rafter 20 from the channel of the support arm 16 at least a distance such that the tongue portions 90 of the latch 28 are outwardly beyond the outer flange 44 of the support arm outer member 32. The handle portions 98 are then released and the latch 28 resiliently returns to the undeflected condition. It will be noted that rather than deflecting both handle portions 98 at once, one handle portion 98 can be inwardly deflected and pushed outwardly before repeating the steps on the other handle portion 98 to release one tongue portion 90 at a time. Once the tension rafter 20 is released from the support arm 16, the above-described steps are repeated to release the other tension rafter 20.

Once the latches 28 are unlocked, the awning 12 is extended in a conventional manner. The support arms 16 are pivoted outwardly about the lower support brackets 18 and the awning 12 is moved toward the extended position as the canopy 26 unrolls from the roller 24. With this movement of the support arms 16, the tension rafters 20 are removed from the channel of the support arms 16. One of the tension rafters 20 is pivoted outwardly and the slide 72 is moved upwardly along the support arm 16 until it locks into place adjacent the roller 24. The tension rafter 20 is lengthened to remove any slack from the canopy 26, to tension the canopy 26, and the knob 60 is tightened to fix the length of the tension rafter 20. It should be noted that the knob 60 is loosened while the awning 12 is still in the stored position so that the tension rafter 20 is free to expand as it is pivoted outwardly. The process is then repeated for the other tension rafter 20. The awning 12 can then be raised by pulling outwardly on the handle 34 of one of the support arms 16 to release the pin from the opening in the support arm inner member 30 and expanding the support arm 16 to a desired height. The handle 34 is the swung inwardly to snap the pin into one of the openings in the inner member 30 of the support arm 16. The process is then repeated on the other support arm 16. If desired, the lower ends of the support arms 16 can be removed from the lower brackets 18, pivoted outwardly, and placed on the ground.

The steps for moving the awning 12 to the extended position can be reversed to move the awning 12 to the stored position. Once the tension rafters 20 are partially nested within the channel of the support arms 16 the tension rafter 20 and support arm 16 are grasped adjacent the latch 28 and squeezed together until the tongue portions 90 of the latch 28 snap into and engage the grooves 47 formed by the flanges 44, 46 of the support arm outer member 32 to retain the tension rafter 20 within the support arm 16. By squeezing the tension rafter 20 and support arm 16 together the tongue portions 90 of the latch 28 are cammed around and inwardly deflected by the outer flange 44 of the support arm outer member 32. As the tongue portions 90 reach the grooves 47 formed by the flanges 44, 46 of the support arm outer member 32, the tongue portions 90 resiliently deflect outwardly. Preferably, the outer flanges 44 of the support arm outer member 32 have rounded or smooth edges in order to minimize the amount of force required to inwardly deflect the tongue portions 90 of the latch 28 around the outer flanges 44 of the support arm outer member 32. Alternatively, the handle portions 98 can be deflected inwardly together, or in sequence, in order to lock each tongue portion 98 of the latch 28 into the grooves 47 formed by the flanges 44, 46 of the support arm outer member 32.

An alternative embodiment of the latch 28 of the present invention is shown in FIG. 6. The latch 108 of the alternative embodiment has a base portion 110 and side portions 112, 114 similar to the above-described preferred embodiment. Extending from the edge of the first side portion 112 opposite the base portion 110 is a tongue portion 116 similar to the above-described preferred embodiment. Extending from the edge of the second side portion 114 opposite the base portion 110, however, is a modified tongue portion 118. The modified tongue portion 118 extends outwardly a distance less than the tongue portion 116 extends from the first side portion 112 and has an upwardly (as viewed in FIG. 7) and inwardly inclined upper surface or angled leadout. Leg portions 120 extend upwardly from the side portions 112, 114. The leg portions 120 are similar to the above-described preferred embodiment.

Extending outwardly from the leg portion 120 extending from the first side portion 112 is a handle portion 122. The handle portion 122 has a first section 124 extending outwardly substantially parallel to a main wall 126 of the base portion 110, and a curved second section 128 extending upwardly (as viewed in FIG. 7) and outwardly from the first section 124. Extending outwardly from the leg portion 120 extending from the second side portion 114 is a flange 130. The flange 130 extends outwardly a distance equal to the tongue portion 116 extending from the first side portion 112 substantially parallel to the main wall 126 of the base portion 110. The flange 130 and the first section 124 of the handle portion 22 are formed and dimensioned to be adjacent the outer surface of the support arm outer flange 44 when the tongue portions 116, 118 are within the grooves 47 formed by the flanges 44, 46 of the support arm outer member 32.

The angled leadout of the tongue portion 118 opposite the handle portion 122, allows the latch 108 to be disengaged from a single side. The latch 108 with a single side disengagement is particularly desirable on "box" or "bag-type" awnings where access is obtainable to only a single side of the components.

Therefore, the awning 12 of the present invention disclosed herein is releasably retained in the stored position, and prevented from extending while the recreational vehicle 10 is traveling, by a latch 28 that is easily locked and unlocked and reduces the cost of the awning. Although a particular embodiment of the invention has been described in detail, it will be understood that the invention is not limited correspondingly in scope, but includes all changes and modifications coming within the spirit and terms of the claims appended hereto.

What is claimed is:

1. A retractable awning mounted on a substantially vertical surface, said awning comprising:

a canopy;

a roller attached to said canopy and about which said canopy can be rolled and unrolled;

a pair of channel-shaped support arms forming a longitudinally extending channel and having at least one lip therein, said support arms having one end supporting said canopy and another end contacting a supporting surface;

a pair of tension rafters having one end operatively secured to said substantially vertical surface and another end operatively connected to an associated one of said support arms, whereby each of said tension rafters is sized to be longitudinally nestable in the channel of the associated support arm; and a latch retained on one of said tension rafters and adapted for engaging said lip of said associated support arm to releasably secure said tension rafter to said associated support arm when nested therein.

2. The awning according to claim 1, wherein said latch has a resiliently displaceable portion biased so that said latch engages said lip of said associated support arm.

3. The awning according to claim 2, wherein said latch has a handle for displacing said resiliently displaceable portion and disengaging said latch from said lip of said associated support arm.

4. The awning according to claim 1, wherein said support arms have a main wall and a pair of side walls which in combination define a longitudinally extending channel, said lip being formed by a pair of flanges extending inwardly from each of said side walls, and wherein said latch has outwardly extending tongues adapted to interlock with said flanges of said support arm.

5. The awning according to claim 1, wherein said latch comprises a spring clip extending substantially around at least three sides of said tension rafter and having a resiliently displaceable portion biased so that said latch engages said lip of said associated support arm to releasably secure said tension rafter within said support arm.

6. The awning according to claim 5, wherein said tension rafters have a top wall, a bottom wall, and side walls which in combination form a generally rectangularly-shaped tube, and wherein said spring clip has a base portion generally adjacent said top wall of said tension rafter and two side portions extending from said base portion generally adjacent to and inclined away from said side walls of said tension rafter.

7. The awning according to claim 6, wherein said side portions of said spring clip form shoulders on an inner surface, and wherein said side walls of said tension rafters form shoulders on an outer surface to engage said shoulders of said spring clip and slidably retain said spring clip on said tension rafter.

8. The awning according to claim 6, wherein said base portion of said spring clip is attached to said tension rafter by an adhesive.

9. The awning according to claim 6, wherein said spring clip has leg portions extending from said side portions and having at least an inwardly extending section generally adjacent said bottom wall of said tension rafter.

10. The awning according to claim 9, wherein said inwardly extending section of said leg portions inclines generally inwardly away from said bottom wall of said tension rafter.

11. The awning according to claim 6, wherein said support arms have a main wall and a pair of side walls which in combination define a channel, said lip being formed by a flange extending inwardly from each of said side walls of said support arms, and wherein said spring clip has tongue portions extending outwardly from each of said side portions to engage said flanges of said support arms.

12. The awning according to claim 11, wherein said spring clip has a handle extending from at least one of said side portions of said spring clip for inwardly deflecting said at least one of said side portions to displace said tongue portions out of engagement with said flanges of said support arms.

13. The awning according to claim 12, wherein said tongue portion extending from the side portion opposite the at least one of said side portions having said handle has an angled leadout.

14. A retractable awning mounted on a side of a recreational vehicle, said awning comprising:

a canopy;

a roller attached to said roller and about which said canopy can be rolled and unrolled;

a pair of channel-shaped support arms having a main wall and a pair of side walls which in combination define a longitudinally extending channel and a pair of flanges extending inwardly from each of said side walls, said support arms having one end supporting said canopy and another end contacting a supporting surface;

a pair of tension rafters having a top wall, a bottom wall, and two side walls which in combination form a generally rectangular tube, said tension rafters having one end operatively secured to said side of said recreational vehicle and another end operatively connected to an associated one of said support arms, whereby each of said tension rafters is sized so as to be nestable in the channel of the associated support arm; and a spring clip retained on one of said tension rafters and having a base portion adapted to be adjacent said top wall of said tension rafter, a pair of angled side portions connected to said base portion and extending upwardly and outwardly from opposed edges of said base portion, and tongue portions extending outwardly from said side portions and adapted to interlock with said flanges of said support arms, wherein said side portions are resiliently displaceable to releasably secure said tension rafter to said associated support arm when nested therein.

* * * * *